US006833124B2

(12) United States Patent
Phelps et al.

(10) Patent No.: US 6,833,124 B2
(45) Date of Patent: Dec. 21, 2004

(54) RECOVERY PROCESS FOR WASTES CONTAINING HEXAVALENT CHROMIUM

(75) Inventors: Andrew Wells Phelps, Kettering, OH (US); Jeffrey Allen Sturgill, Fairborn, OH (US); Joseph Thomas Swartzbaugh, Phillipsburg, OH (US)

(73) Assignee: University of Dayton, Dayton, OH (US)

( * ) Notice: Subject to any disclaimer, the term of this patent is extended or adjusted under 35 U.S.C. 154(b) by 176 days.

(21) Appl. No.: 10/066,533

(22) Filed: Jan. 31, 2002

(65) Prior Publication Data

US 2003/0143137 A1 Jul. 31, 2003

(51) Int. Cl.⁷ .............................................. C22B 34/00
(52) U.S. Cl. .......................... 423/55; 423/58; 210/913
(58) Field of Search ....................... 423/55, 58; 210/913

(56) References Cited

U.S. PATENT DOCUMENTS

| | | | |
|---|---|---|---|
| 3,616,344 A | * 10/1971 | Peterson et al. | ............ 205/673 |
| 3,869,386 A | * 3/1975 | Izdebski | .................... 588/236 |
| 4,306,946 A | 12/1981 | Kim | |
| 4,705,639 A | 11/1987 | Aldrich | |
| 5,000,859 A | 3/1991 | Suciu et al. | |
| 5,002,645 A | 3/1991 | Eastland, Jr. et al. | |
| 5,171,547 A | 12/1992 | Crnojevich et al. | |
| 5,200,088 A | 4/1993 | Pilznienski | |
| 5,256,306 A | 10/1993 | Griffin | |
| 5,316,684 A | 5/1994 | Morico | |
| 5,397,478 A | 3/1995 | Pal et al. | |
| 5,571,489 A | 11/1996 | Holsen et al. | |
| 5,753,125 A | 5/1998 | Kreisler | |
| 5,766,428 A | 6/1998 | Iida | |
| 5,769,938 A | 6/1998 | Ueshima et al. | |
| 5,770,090 A | 6/1998 | Lewis, III | |
| 5,810,920 A | 9/1998 | Ueshima et al. | |
| 5,827,411 A | 10/1998 | Bishara et al. | |

FOREIGN PATENT DOCUMENTS

| | | | |
|---|---|---|---|
| EP | 1 178 014 A1 | | 2/2002 |
| FR | 2607489 | * | 6/1988 |
| RU | 2006484 | * | 1/1994 |
| SU | 1323537 | * | 7/1987 |
| WO | WO 00 59833 A | | 10/2000 |
| WO | WO 02 16271 A | | 2/2002 |

OTHER PUBLICATIONS

Rajamani, S. et al: "Clean Technology in the Leather Industry—Chrome Recovery and Reuse". Water Pollution Control Federation Annual Conference, pp. 1–12, Oct., 1990.

* cited by examiner

Primary Examiner—S J Bos
(74) Attorney, Agent, or Firm—Dinsmore & Shohl LLP (57) ABSTRACT

A process for recovery of hexavalent chromium from waste streams. The method includes providing a waste stream containing hexavalent chromium, reacting a soluble non-toxic precipitating reagent with the hexavalent chromium to form an insoluble precipitating reagent-chromate precipitate, and recovering the insoluble precipitating reagent-chromate precipitate. It may optionally include reacting the insoluble precipitating reagent-chromate precipitate with an acidic solution to form an insoluble precipitating reagent precipitate and a soluble hexavalent chromium compound, and recovering the soluble hexavalent chromium compound. The process may also include reacting the insoluble precipitating reagent precipitate with a solubilizing reagent to form the soluble non-toxic precipitating reagent.

42 Claims, 9 Drawing Sheets

RECOVERY PROCESS FOR WASTES CONTAINING HEXAVALENT CHROMIUM

BACKGROUND OF THE INVENTION

This invention relates generally to processes for extracting hexavalent chromium from aqueous solutions while retaining its oxidation state, and more particularly to processes which allow easy recovery and optional reuse of hexavalent chromium from extracted aqueous solutions.

Many industrial processes generate waste containing chromium in the hexavalent charge state. Examples include, but are not limited to, aqueous waste streams, sludges, and solids from metal fabrication operations including chrome plating, anodizing, conversion coating, and phosphating, from paints and paint extracts, from the manufacture of polymers and plastics, from leather tanning, from the manufacture of wood preservatives, fungicides, and other pesticides, and leachates from landfills and contaminated sites.

Waste from electroplating operations is fairly well characterized. The chromium metal finishing and plating process lines in many commercial plating shops are arranged so that the plating rinse tanks containing hexavalent chromium are countercurrent rinses. The concentration of Cr(VI) in these waste rinse waters is very low. The greatest amount of hexavalent chromium in the waste of most plating shops is found in the process dump tanks. Separate extraction of the hexavalent chromium in dump tanks combined with extraction of the hexavalent chromium in plating rinse tanks could reduce the overall release of chrome from a given operating facility by more than 95%.

The waste water from chromium plating operations contains other materials in addition to hexavalent chromium. High concentrations of sulfates are present because high concentrations of sulfuric acid are used in the plating baths. There are also minor concentrations of other chemicals, including ions of trivalent chromium, chloride and fluoride ions, ferric and ferrous ions from the steel base metal, lead from electrodes, and barium ions. There may also be minor amounts of mixed hydrocarbons from the steel base metal.

The pH of the waste waters is typically between 0.5 and 2.5, and the temperature is generally between about 40° and 60° C.

Other aqueous hexavalent chromium waste streams exhibit similar characteristics. Anodizing or phosphating rinses used in metal treating can be composed solely of hexavalent chromium in solution at a temperature of about 50° C. Metal surface conversion coating wastes may also contain other ionic and dissolved components inherent in the original solution, e.g., fluorides, molybdates, or ferricyanides.

One method currently used to treat waste streams containing hexavalent chromium is to reduce the hexavalent chromium to the trivalent oxidation state with concurrent elevation of the pH. This process results in the reduction of Cr(VI) to Cr(III) and the formation of copious amounts of mixed Cr(III) oxide/hydroxide precipitates. Ferrous salts or tetravalent sulfur species are used most frequently to reduce Cr(VI) to Cr(III). Ferrous salts may be added alone or in combination with a water-soluble sulfide, such as sodium sulfide, to the solution. Metallic iron reportedly performs the same reduction of the Cr(VI) ion, although at a much slower reaction rate. When ferrous species are used as the reducing agent, the precipitate formed is even more voluminous due to the formation of a mixed Cr(III)-Fe(III) hydroxide. The use of sulfites ($SO_3^{2-}$) or metasulfites ($S_2O_5^{2-}$) helps to alleviate this problem somewhat, but the fluffy precipitated flocs are still difficult to aggregate into a dense compact precipitate.

Reduction of hexavalent chromium has been successfully implemented using electrolysis, although the energy costs increase significantly as the concentration of chromium decreases. Reduction of hexavalent chromium has also been demonstrated using formaldehyde, xanthates, and anaerobic microorganisms in solution.

As a practical matter, processes which result in the reduction of the hexavalent chromium to the trivalent oxidation state preclude reuse of the chromium. For example, the Cr(III) hydroxide made using conventional reduction/precipitation treatment approaches is in a form from which recovery is not cost effective. If an iron reduction process is used, the Cr(III) formed is intimately mixed with Fe(III). Even if the Cr(III) hydroxide is prepared in a "pure" form, such as from bisulfite reduction, the voluminous hydroxide precipitate would then need to be resolubilized and reoxidized to hexavalent chromium. This would not be practical in a plating facility because of the enormous energy input required for reoxidation.

Technologies have been developed for removal of hexavalent chromium in a form that conceptually allows for recovery and reuse. For example, anion exchange has been used to remove hexavalent chromium, but the process is difficult to control under the harsh conditions found in plating waste streams. Similar operational difficulties have been encountered with carbon absorption processes. Evaporation has also been used, but it requires a tremendous energy input or a long time, which renders the technology impractical for plating facilities.

In light of the difficulties associated with existing treatment and recovery processes, different chromium electroplating precursors have been examined, including soluble trivalent chromium. However, these alternatives have not been generally accepted yet, and hexavalent chromium is currently the preferred plating precursor.

Hexavalent chromium is extremely toxic. As a result, the United States Environmental Protection Agency (U.S. EPA) limits discharge of hexavalent chromium to 5 ppm, and the limits in some state and local jurisdictions are even lower. In addition, the current cost of disposing of a 55 gallon drum of waste containing hexavalent chromium is on the order of several hundred dollars.

Therefore, there is a need for a method of recovering and optionally reusing the hexavalent chromium in waste streams.

SUMMARY OF THE INVENTION

The present invention meets this need by providing a process for recovery of hexavalent chromium from streams. The method includes providing a stream containing hexavalent chromium, reacting a soluble non-toxic precipitating reagent with the hexavalent chromium to form an insoluble precipitating reagent-chromate precipitate, and recovering the insoluble precipitating reagent-chromate precipitate. The process optionally includes reacting the insoluble precipitating reagent-chromate precipitate with an acidic solution to form an insoluble precipitating reagent precipitate and a soluble hexavalent chromium compound, and recovering the soluble hexavalent chromium compound. The process may also include reacting the insoluble precipitating reagent precipitate with a solubilizing reagent to form the soluble non-toxic precipitating reagent.

The soluble non-toxic precipitating reagent includes, but is not limited to, bismuth compounds; lanthanide compounds; aluminum compounds; titanium compounds; trivalent chromium compounds; organic compounds containing a group selected from nitronium, phosphonium, sulfonium, stibonium, iodonium, pyrylium, or combinations thereof; or combinations thereof.

The acidic solution includes, but is not limited to, sulfuric acid, hydrochloric acid, hydrofluoric acid, boric acid, phosphoric acid, pyrophosphoric acid, phosphomolybdic acid, phosphotungstic acid, silicomolybdic acid, silicotungstic acid, or combinations thereof. The acidic solution includes, but is not limited to, acidic oxalates, malonates, succinates, maleates, fumarates, malates, tartrates, salicylates, or combinations thereof.

The insoluble precipitating reagent-chromate precipitate may have a solubility in water of less than $1\times10^{-2}$ M $Cr^{+6}$ (500 ppm $Cr^{+6}$). Optimally, the insoluble precipitating reagent-chromate precipitate may have a solubility in water of less than $5\times10^{-3}$ M $Cr^{+6}$ (250 ppm $Cr^{+6}$)

The solubilizing reagent includes, but is not limited to, nitric acid, perchloric acid, sulfuric acid, hydrochloric acid, acetic acid, propionic acid, lactic acid, citric acid, or combinations thereof

DESCRIPTION OF THE INVENTION

The process of the present invention is simple to operate, and it can remove most of the hexavalent chromium from chrome-containing wastes. In addition, it permits recovery of the hexavalent chromium as well as the precipitating reagent. The precipitates which are formed are much denser than conventional hexavalent chromium treatment flocs, which makes separation and dewatering much easier. The hexavalent chromium precipitate formed from this process can be stable to over 400° C., which suggests that there should not be any problems associated with handling unstable compounds.

Figure 1:
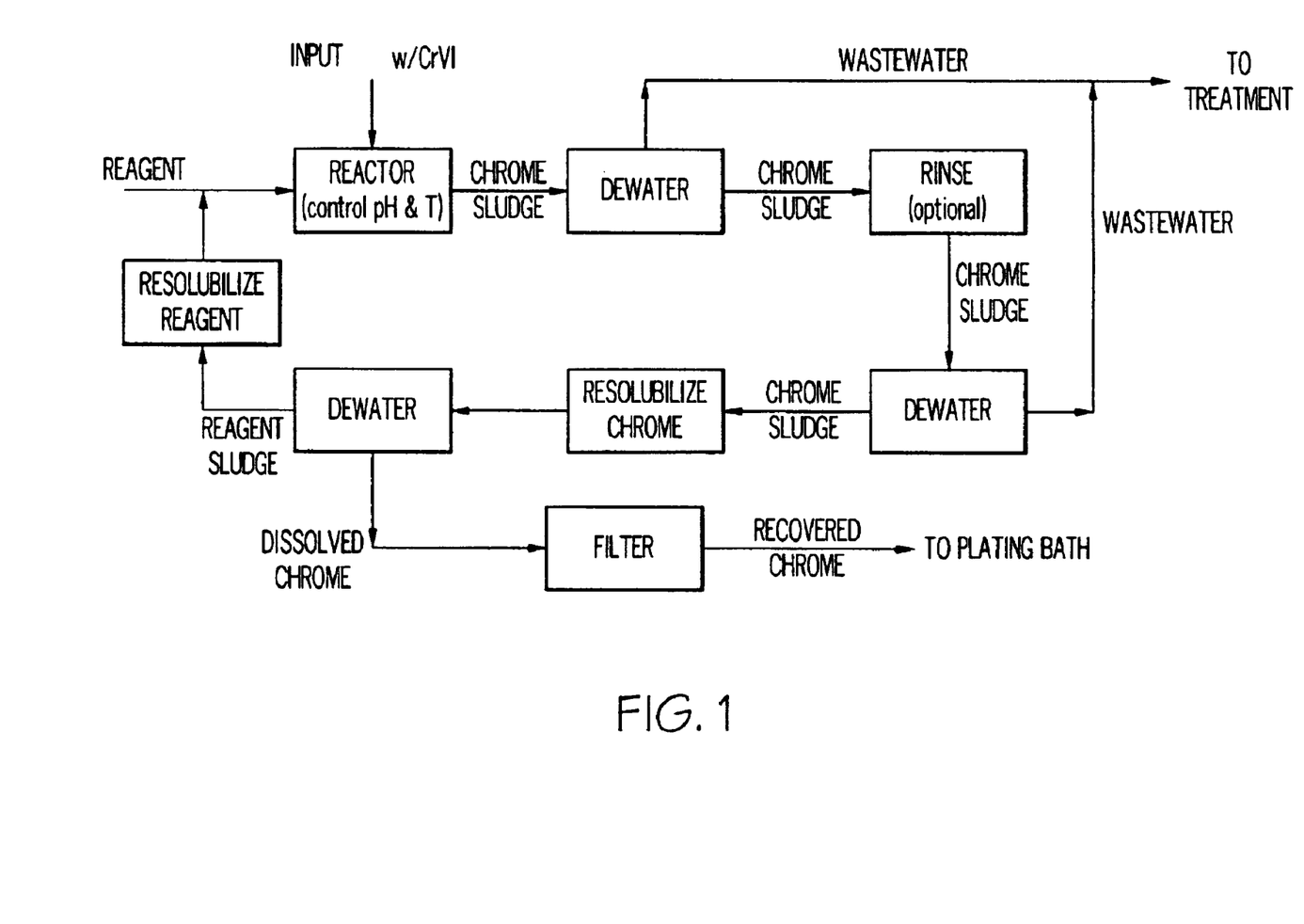
FIG. 1 is a flow diagram of the process of the present invention.

FIG. 1. shows the flow diagram for the general process. The stream containing hexavalent chromium enters a reactor. A soluble non-toxic precipitating reagent is added to the reactor. The precipitating reagent reacts with the hexavalent chromium to form an insoluble precipitating reagent-chromate precipitate. The chromium remains in the hexavalent state in the precipitate, which has been verified using x-ray photoelectron spectroscopic analysis (XPS). The precipitate is very dense and crystalline. The volume of the precipitate formed is about one fifth of the volume of the precipitate formed from the ferrous reduction of hexavalent chromium. As a result of this volume reduction, the precipitate can be easily filtered and dewatered.

Only a very limited number of metal ions form very insoluble chromates. Most of them, including lead, thallium, silver, barium, and mercury, are themselves toxic which makes their use unacceptable. However, the chromates of bismuth and lanthanide species are also very insoluble. Unlike the metals listed above, the toxicity of soluble bismuth and lanthanide species is low. Bismuth is taken orally in common stomach remedies. The oral toxicities (LD50) of some lanthanide nitrates to rats are as follows: lanthanum—4.5 g/kg, cerium—4.2 g/kg, praseodymium—3.5 g/kg, and neodymium—2.75 g/kg. These compounds are even less toxic than some of the reagents which are currently used in hexavalent chromium treatment: ferrous sulfate—1.39 g/kg, and sodium bisulfite—2.0 g/kg.

The lanthanides include elements with atomic numbers 39, and 57-71. The more common lanthanides, including lanthanum, cerium, yttrium, praseodymium, and neodymium, are readily available, and are used in a number of industrial applications. These reagents are somewhat more expensive than conventional hexavalent chromium precipitating reagents. However, the conventional process disposes of the precipitating reagents after a single use, while the present invention allows for recovery and reuse of the precipitating reagent. In addition, because these metal ions are trivalent, they can precipitate more chromate on a per weight basis than ferrous or bisulfite ions.

Aluminum, titanium, and trivalent chromium ions can also be used to precipitate hexavalent chromium under the proper pH and concentration conditions. Although they do not remove as much hexavalent chromium as bismuth or the lanthanides (due to the slightly higher solubility of their corresponding chromates and dichromates), recycling of these ions may not be necessary because of their lower cost.

Potassium or calcium salts of these metals (bismuth, lanthanides, aluminum, titanium, and trivalent chromium) may also be used under the proper pH and concentration conditions. Thus, alum (potassium-aluminum sulfate) can remove some hexavalent chromium from waste solutions. However, the potassium or calcium-containing metal chromates will exhibit higher solubilities in water and may or may not achieve the desired solubility range.

Several organic species which can form insoluble chromates have also been identified. These include large organic molecules (those having a formula weight of greater than 250 AMU) which contain nitronium ($N^+$), phosphonium ($P^+$), sulfonium ($S^+$), stibonium ($Sb^+$), iodonium ($I^+$), or pyrylium ($O^+$) groups. Of these, large aromatic ringed nitronium cations, such as benzopyridinium and cetylpyridinium, and phosphonium cations are the most desirable.

The process requires very little pH or temperature control. Bismuth works at the low pHs typically exhibited by hexavalent chromium solutions, as well as at neutral pHs. The lanthanides, and especially aluminum, titanium, and trivalent chromium, may require a slight pH adjustment to maximize precipitation. At pH values higher than 8, the use of organic species to precipitate the hexavalent chromium is not feasible. In addition, the process can be performed over a wide range of temperatures, from about 5° C. to about 100° C.

The desired solubility of the chromate precipitates is less than 500 ppm $Cr^{+6}$ ($1\times10^{-2}$ M $Cr^{+6}$). Ideally, it should be less than 250 ppm ($5\times10^{-3}$ M $Cr^{+6}$). While this does not reach the discharge limit of 5 ppm, it does allow removal of most of the hexavalent chromium in waste waters, which typically have initial concentrations on the order 50,000 ppm for plating wastes from tank dumps, 5,000 ppm from conversion coating solutions, and a wide range of possible concentrations for other chrome waste streams.

In some cases, precipitation and recovery of the chromate may be all that is necessary. The reduction in the volume of the precipitate using the present invention will provide significant cost savings in waste disposal. However, in other situations, it may be desirable to recover and reuse the hexavalent chromium and/or the non-toxic precipitating reagent.

The precipitating reagent-chromate precipitate may be dewatered, with the waste water being sent for additional treatment if necessary. The precipitate can be rinsed and dewatered if desired, with the waste water being sent for treatment.

The insoluble precipitating reagent-chromate precipitate can be separated into the hexavalent chromium and the non-toxic precipitating reagent by resolubilization of the hexavalent chromium. This can be achieved by applying an acidic solution to the insoluble precipitating reagent-chromate precipitate forming an insoluble precipitating reagent precipitate and a soluble hexavalent chromium compound. The precipitating reagent precipitate remains insoluble following application of the acidic solution. Therefore, the solution containing the hexavalent chromium compound can be easily separated by filtering or centrifuging out the insoluble precipitating reagent precipitate.

If the waste originally came from a plating operation, the recovered solution containing the hexavalent chromium compound is almost the same as the precursor plating bath. The recovered solution containing the hexavalent chromium compound can be matched to the original plating solutions by adding "virgin" chromium to make-up the chromium concentration, and it can be reused in the plating bath. Alternatively, solid hexavalent chromium can be obtained from the solution by processes including, but not limited to, evaporation, freeze drying, or "salting out" the desired compound.

The selection of the acidic solution depends on which precipitating reagent is used. The reaction of the acidic solution and the precipitating reagent should form an insoluble precipitating reagent precipitate. For bismuth, standard mineral acids such as sulfuric or hydrochloric will work (forming insoluble bismuth oxysulfate or oxychloride). Hydrofluoric acid may also used (forming bismuth fluoride). If hydrofluoric acid is used, the excess fluoride may need to be removed from the solubilized chromium stream prior to further use in plating. Other options for bismuth include acidic borates, phosphates, pyrophosphates, salicylates, tartrates, malonates, malates, fumarates, maleates, and succinates. These can be added either as acids or salts. If the acid form is used, it can be added alone. If the salt form is used, it should be added with an inorganic acid. By acidic borates, etc., we mean either the acid form or the salt form.

During the chromate precipitation process, in addition to the formation of insoluble bismuth chromate, insoluble bismuth oxysulfate may form due to the presence of sulfate ions in the waste stream. However, the chrome-to-sulfate ratio in the plating baths is generally in the range of 100:1 to 80:1. Therefore, although some bismuth may not be available to complex chromate, the total amount of sulfate is small in proportion to chromium. Moreover, the sulfate-complexed bismuth will be available to the overall process because it will be recycled when the bismuth is recovered.

The sulfates and chlorides of the lanthanides may be too soluble to effect separation from the hexavalent chromium. However, hydrofluoric acid can be used to form insoluble lanthanide fluorides. Acidic oxalates, phosphates, pyrophosphates, borates, malonates, succinates, maleates, fumarates, malates, tartrates, and salicylates are other options for the lanthanides.

The sulfates and chlorides of trivalent chromium are also too soluble to effect separation from the hexavalent chromium. However, hydrofluoric or phosphoric acids can be used to form insoluble chromium fluoride or chromium phosphate, respectively. Acidic pyrophosphates, salicylates, and tartrates are other options.

The options for titanium are even more limited. Acidic tartrate, salicylate, malate, oxalate, and malonate are the species capable of separating titanium from hexavalent chromium.

Separation of aluminum from hexavalent chromium can be achieved through the use of acidic borates, phosphates, pyrophosphates, oxalates, malonates, succinates, maleates, fumarates, malates, tartrates, and salicylates.

Separation of large organic cations from hexavalent chromium can be achieved using acidic phosphates, pyrophosphates, phosphomolybdates, phosphotungstates, silicomolybdates, or silicotungstates.

The precipitating reagent can also be recovered for reuse, if desired. Although reuse of the precipitating reagent is not necessary, the economics of the overall process can be improved if it is recovered and reused also. This is especially true for bismuth and the lanthanides.

Recovery of the precipitating reagent can be achieved by converting the insoluble precipitating reagent precipitate back into a soluble form. The resolubilized precipitating reagent can then be reused to react with the stream containing hexavalent chromium to begin the process again. The recovered solution can be added directly to the stream containing the hexavalent chromium, with the addition of virgin precipitating reagent if needed to obtain the desired concentration. Alternatively, the precipitating reagent can be recovered as a solid using processes including, but not limited to, evaporation, freeze drying, and "salting out" the desired compound.

The nitrates and perchlorates of bismuth are water-soluble. The nitrates may be prepared by reacting nitric acid with a number of bismuth compounds. The perchlorates may be prepared by reacting bismuth compounds with perchloric acid. Formation of bismuth lactates or citrates through reaction with lactic or citric acids is another option.

The nitrates and perchlorates of the lanthanides are also water soluble. Nitrates can be formed using nitric acid. Tetravalent nitrates can be formed for cerium and praseodymium if an oxidizer is added. Higher valence states are desirable because more chromium can be complexed with a mole of precipitant. Perchlorates can be prepared using perchloric acid. Tetravalent perchlorates can be formed for cerium. Other options for the lanthanides include the use of hydrochloric acid, sulfuric acid, acetic acid, propionic acid, and lactic acid to form chlorides, sulfates, acetates, propionates, and lactates.

Trivalent chromium can be used by conversion to water-soluble perchlorate, nitrate, or sulfate through the use of perchloric, nitric, or sulfuric acids, respectively. Formation of chromium chloride or lactate through reaction with hydrochloric or lactic acid is another option. If it is cost effective, the trivalent chromium precipitate can be discarded after recovery of chromate.

The nitrate, sulfate, perchlorate, lactate, and citrate of aluminum are also water-soluble. These salts can be formed by the action of the appropriate acid on the separated aluminum salt. If it is cost effective, the aluminum precipitate can be discarded after recovery of chromate.

The nitrate, sulfate, perchlorate, and lactate of titanium are water-soluble. These salts are formed by the action of the appropriate acid on the separated titanium salt. If it is cost effective, the titanium precipitate can be discarded after recovery of chomate.

The organic compounds can be reused by conversion to water-soluble fluorides, chlorides, or sulfates, using the appropriate acids. If it is cost effective, the organic precipitate can be discarded after separation of the recovered chromate.

For the separated precipitates of bismuth, lanthanides, aluminum, titanium, and trivalent chromium, it may be advantageous first to convert the precipitate to an oxide or hydroxide through a low temperature roasting process prior to application of the acids. For most of the metal precipitates, this can readily be accomplished at temperatures below 250° C. Subsequent application of acid to the formed oxide or hydroxide will result in a much purer soluble product than if no roasting were used. This is desirable if the chromate is to be reused. Evaporation, freeze-drying, or "salting out" of the process fluid will result in a solid product that can also be reintroduced to the first unit operation of the process.

The described approach makes use of three separate unit operations. For each unit operation, the performance of different reagents are presented under a range of conditions, such as temperature and pH. Some reagents are more preferable based on performance, cost, and availability under some operating conditions, while others may be more effective under other conditions.

The invention will be further described in the following examples, which report validation testing on surrogate and actual hard chrome plating wastes, but which do not limit the scope of the inventions described in the claims.

EXAMPLE 1
Precipitation of Hexavalent Chromium

Initial testing involved the preparation of "surrogate" plating solutions containing 1 M $Cr^{+6}$ (52,000 ppm) with $CrO_3$ as the hexavalent chromium source. Four separate stock solutions of this chromium concentration were prepared, with pH values of 0.87, 1.92, 4.6, and 5.75. These solutions were prepared by adding either sulfuric acid or sodium hydroxide to the chrome solution so that 1 M concentration was maintained. Acidic pH conditions were tested due to the notoriously acidic nature of hexavalent chromium solutions. Candidate treatment options were then tested on the prepared "surrogate" solutions through a 2:1 molar addition of a soluble candidate treatment chemical. The residual metal concentrations (after settling and filtering twice through 0.3 micron glass fiber filter paper) were measured using a Perkin-Elmer AA spectrometer. Candidate treatment options were vendor-supplied reagent chemicals of known purities. For every ten samples analyzed or prepared, at least one duplicate sample was prepared, or analysis performed.

Figure 2:
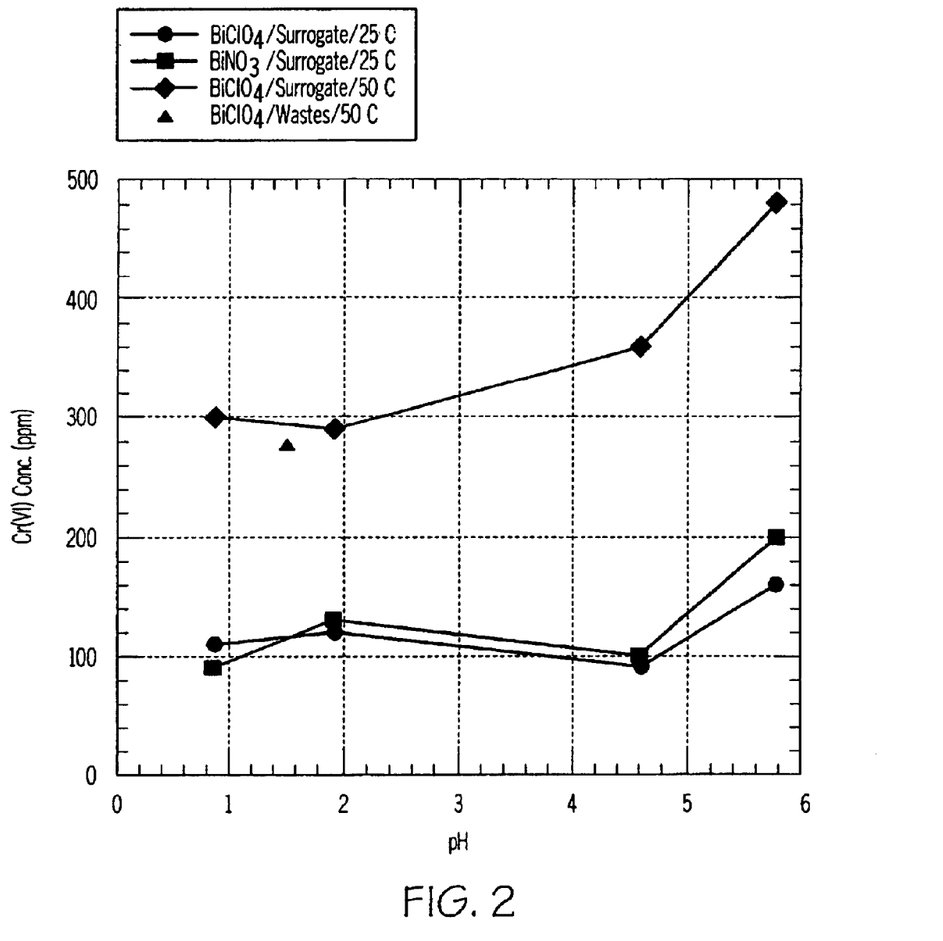
FIG. 2 is a graph showing residual concentration of Cr(VI) v. pH for bismuth chromate.
Figure 3:
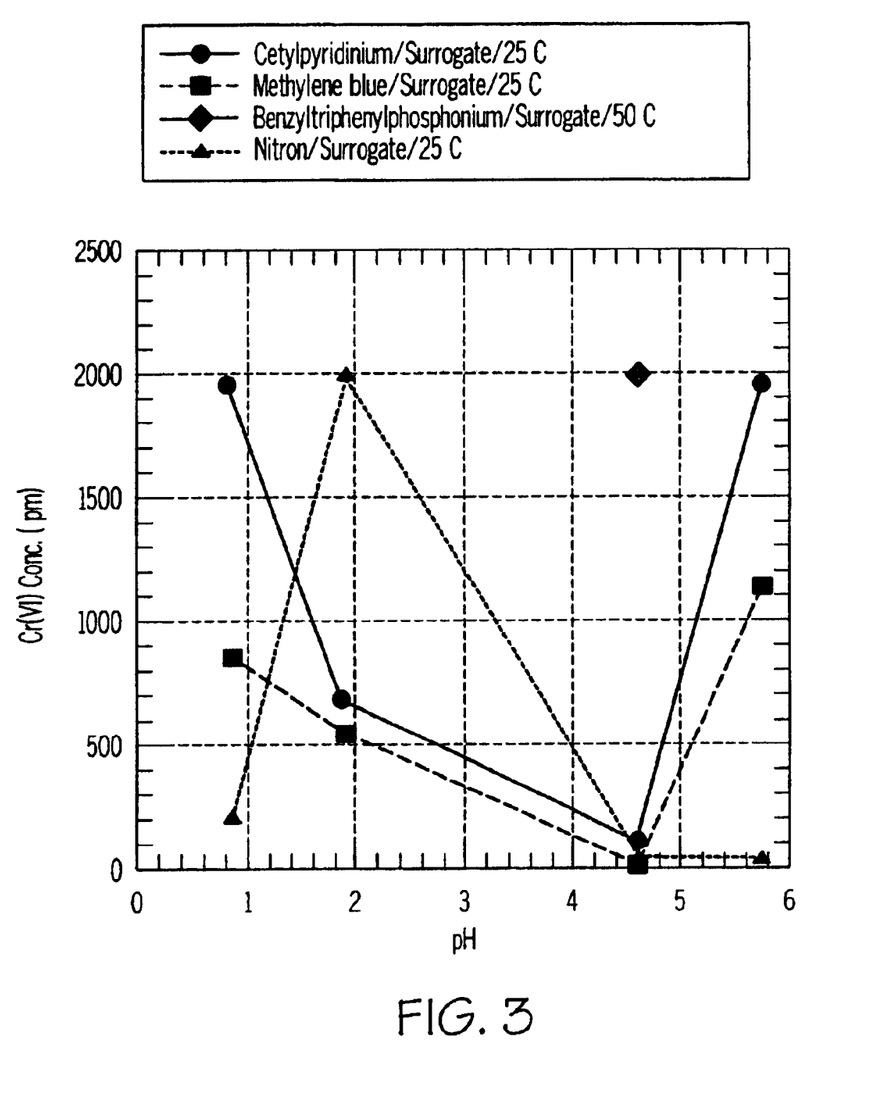
FIG. 3 is a graph showing residual concentration of Cr(VI) v. pH for certain organic chromates.

Table 1 shows the options that were tested for hexavalent chromium precipitation, along with observations and comments about each of the candidate treatment/recovery options that were tested. FIG. 2 is a graphical representation of the residual chromium concentrations versus pH for the bismuth chromate system while FIG. 3 shows chromium concentrations versus pH for several organic cations that formed recoverable precipitates.

TABLE 1

Residual Chromium Concentrations versus Reagent and pH for Tested Precipitants at 25° C. and 50° C.

| Tested Cation/pH/Temp. | Residual Cr Concentrations ppm (mg/L) | Comments |
| --- | --- | --- |
| Bismuth-0.87/25° C. | 92 | Yellow precip. |
| Bismuth-0.87/25° C.* | 105 | Yellow precip. |
| Bismuth-1.92/25° C. | 124 | Yellow precip. |
| Bismuth-1.92/25° C.* | 119 | Yellow precip. |
| Bismuth-4.6/25° C. | 100 | Yellow precip. |
| Bismuth-4.6/25° C.* | 96 | Yellow precip. |
| Bismuth-5.75/25° C. | 199 | Yellow precip. |
| Bismuth-5.75/25° C.* | 159 | Yellow precip. |
| Bismuth-0.87/50° C. | 300 | Yellow precip. |
| Bismuth-1.92/50° C. | 288 | Yellow precip. |
| Bismuth-4.6/50° C. | 362 | Yellow precip. |
| Bismuth-5.75/50° C. | 482 | Yellow precip. |
| Barium-0.87/25° C. | 255 | Yellow precip. |
| Barium-1.92/25° C. | 304 | Yellow precip. |
| Barium-4.6/25° C. | 265 | Yellow precip. |
| Barium-5.75/25° C. | 386 | Yellow precip. |

*Duplicate samples performed with different soluble bismuth salt ($NO_3^-$ vs. $ClO_4^-$)

| Tested Cation/pH/Temp. | Residual Cr Concentrations ppm (mg/L) | Comments |
| --- | --- | --- |
| Tetrapentylammonium | ~300 for each | No solid precipitate formed Rather, an undesirable yellow gelatinous mass |
| Trioctylammonium | ~300 for each | No solid precipitate formed Rather, an undesirable separate yellowish liquid phase. |
| Acridinium | ≥2000 | |
| Cetylpyridinium-0.87/25° C. | ≥2000 | |
| Cetylpyridinium-1.92/25° C. | 724 | Yellow precip. |
| Cetylpyridinium-4.6/25° C. | 143 | Yellow precip. |
| Cetylpyridinium-4.6/25° C.* | 125 | Yellow precip. |
| Cetylpyridinium-5.75/25° C. | ≥2000 | |
| Nitron-0.87/25° C. | ≥2000 | |
| Nitron-1.92/25° C. | ≥2000 | |
| Nitron-4.6/25° C. | 55 | Tan precip. |
| Nitron-4.6/25° C.* | 45 | Tan precip. |
| Nitron-5.75/25° C. | 38 | Tan precip. |
| Methylene Blue-0.87/25° C. | 838 | Blue-green precip. |
| Methylene Blue-1.92/25° C. | 543 | Blue-green precip. |
| Methylene Blue-4.6/25° C. | 19 | Blue-green precip. |
| Methylene Blue-4.6/25° C.* | 26 | Blue-green precip. |
| Methylene Blue-5.75/25° C. | 1095 | Blue-green precip. |
| BTPP-0.87/25° C. | 202 | Yellow precip. |
| BTPP-1.92/25° C. | ≥2000 | |
| BTPP-4.6/25° C. | ≥2000 | |
| BTPP-4.6/25° C.* | ≥2000 | |
| BTPP-5.75/25° C. | ≥2000 | |
| Polyvinylpyrrolidone | ≥2000 | |

*Duplicate samples
BTPP = benzyltriphenylphosphonium

As can be seen in FIG. 2, bismuth readily removes a majority of the hexavalent chromium as insoluble bismuth chromate. Because the starting solutions contained 1 M $Cr^{+6}$, or 52,000 ppm $Cr^{+6}$, 99+% removal efficiency was achieved by this reagent. FIG. 3 shows that the removal efficiency of the organic cations is strongly pH dependent.

The thermal stability of the chromate precipitates formed is of importance due to the strongly oxidizing nature of the chromate ion. Even if the precipitates are not explosive, low thermal degradation temperatures would make the handling or transport of these chromate precipitates problematic.

Figure 4:
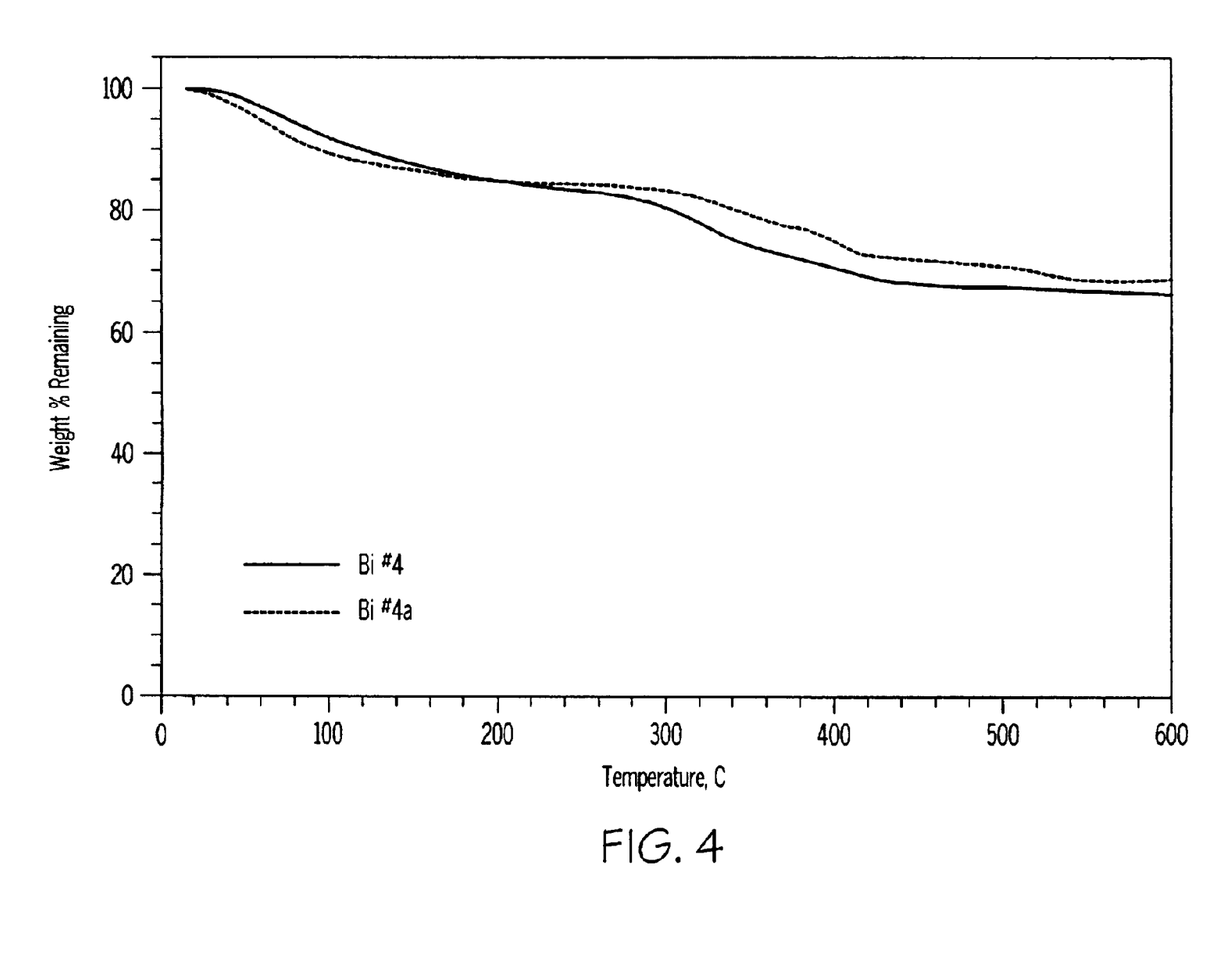
FIG. 4 is a graph showing the thermogravimetric analysis of bismuth chromate precipitate.
Figure 5:
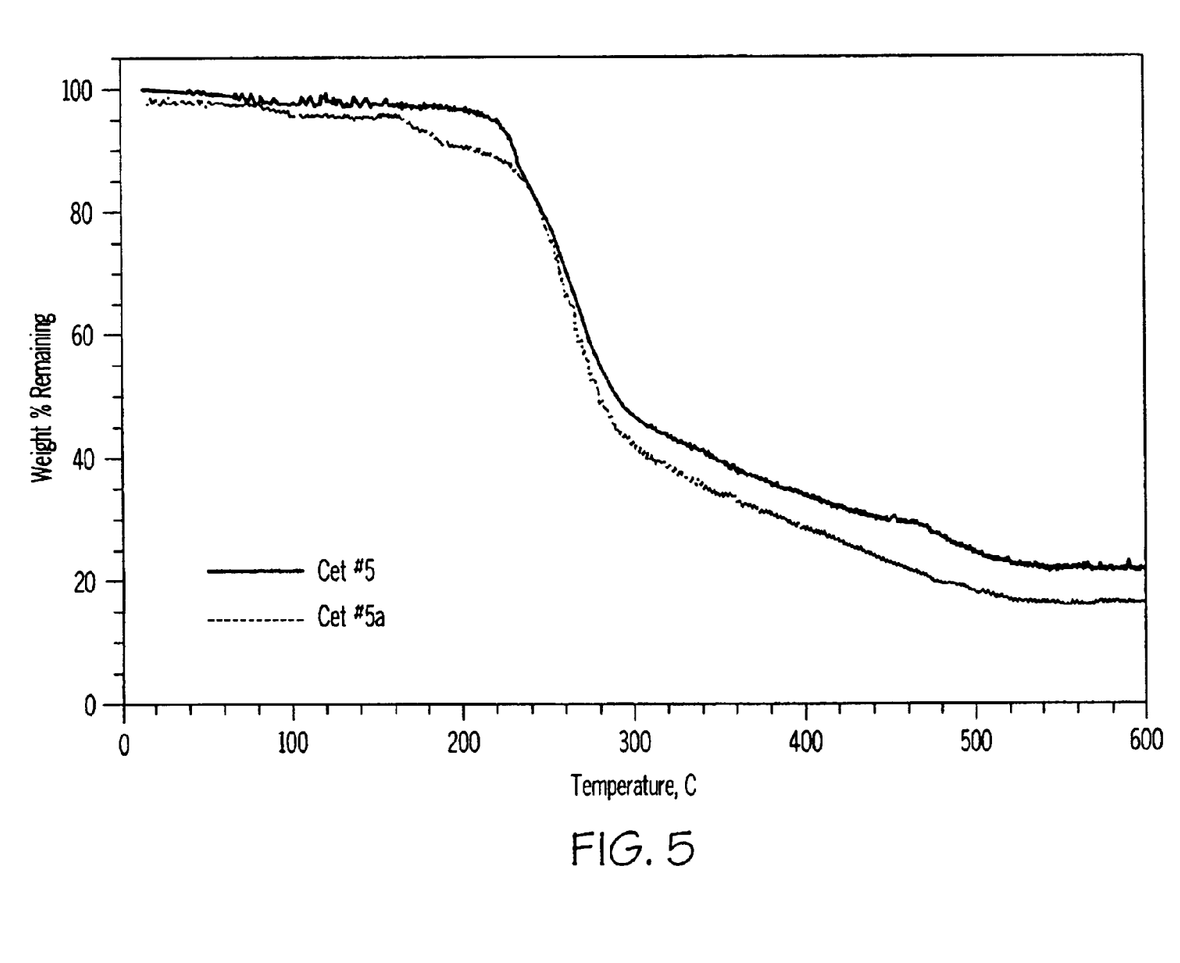
FIG. 5 is a graph showing the thermogravimetric analysis of cetylpyridinium chromate precipitate.
Figure 6:
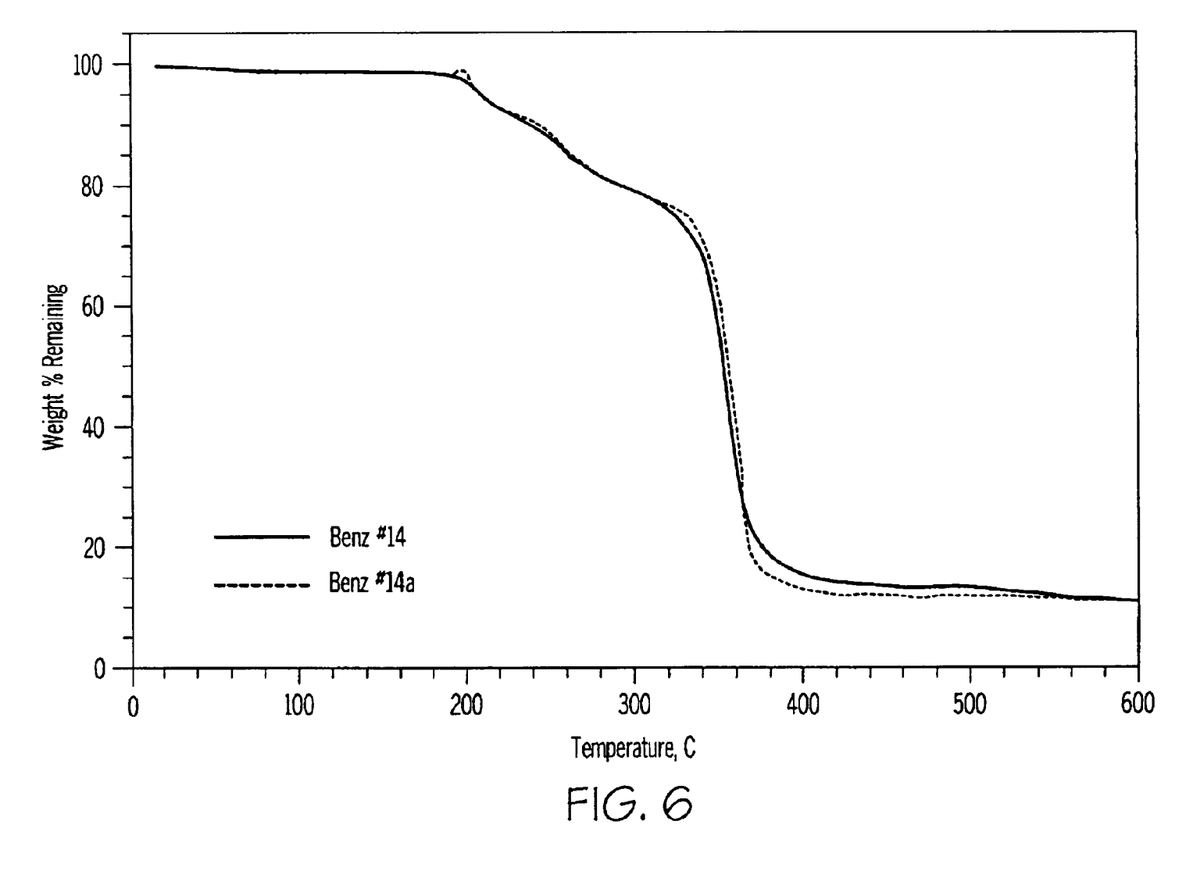
FIG. 6 is a graph showing the thermogravimetric analysis of benzyltriphenylphosphonium chromate precipitate.

The thermal stability of the most promising chromate precipitates was analyzed using thermogravimetric analysis (TGA). A sample of the precipitate was carefully weighed at ambient temperature, and the amount of weight loss recorded as a function of temperature increase. FIGS. 4, 5, and 6 show the TGA measurements conducted on bismuth, cetylpyridinium, and benzyltriphenylphosphonium cations, respectively. As can be seen from these Figures, cetylpyridinium chromate begins to decompose at approximately 250° C., and benzyltriphenylphosphonium chromate at approximately 350° C. Bismuth chromate is apparently stable up to 600° C. Although a minor amount of weight loss for this compound can be observed, this is attributable to water loss from the precipitate.

The performance of precipitation studies at a variety of pH conditions revealed cations that may or may not be acceptable for use in the recovery process. For example, barium forms an insoluble chromate, but the amount of residual hexavalent chromium is higher than for bismuth chromate. In addition, the use of barium is regulated in many states. Therefore, while barium can be used in the process, it may not be desirable in some situations.

The organic cations tested exhibited a remarkable diversity of properties based on the organic cation as well as the pH conditions. As can be seen from FIG. 3, residual chromium concentrations are strongly dependent upon pH conditions. This variability as a function of processing pH implies that the achievement of consistent discharge concentrations on a day-to-day basis in the field may be difficult. Ammonium and piperazinium derivatives, with TGA decomposition temperatures below 200° C., may not be suitable for some situations due to their low thermal stability. Alkaloid derivatives are extremely toxic, and are therefore undesirable. The one polymeric cation tested, polyvinylpyrrolidone, did not precipitate chromate under acidic conditions. Pyridinium derivatives or cations derived from other large rings, and phosphonium cations performed well. The most "consistent" chromium concentrations as a function of pH, as well as achieving low chromium levels, were exhibited by the four complexes: cetylpyridinium, benzyltriphenylphosphonium, methylene blue, and nitron (Table 1).

The TGA evaluation of these precipitates indicated that the organic and organometallic chromates exhibit far lower thermal stability than bismuth chromate. While the decomposition temperatures (i.e., 200 to 300° C.) do not necessarily indicate difficulties in handling these materials at ambient temperatures, these materials may not be desirable in some situations. Bismuth chromate was chosen to carry forward to the next phase of testing devoted to the second unit operation in the overall process because of its thermal characteristics.

It can be seen from Table 1 and FIG. 2 that the application of bismuth to the waste solutions results in residual hexavalent chromium concentrations higher than acceptable discharge limits (i.e., 5 ppm). Existing ferrous or bisulfite treatment systems can be used to treat the remaining chromium. Sending very low chromium concentrations to these existing treatment systems is more desirable than sending the high concentrations associated with tank dumps.

A sample of the prepared bismuth chromate precipitate was analyzed using x-ray photoelectron spectroscopy (XPS), which indicated that the oxidation state of the chromium contained therein was hexavalent. A 2:1 ratio of Bi to Cr was used throughout the development program, although the concurrent use of alkali (e.g., potassium) may allow for the use of a 1:1 ratio of Bi to Cr, albeit with slightly higher solubility. The application of bismuth perchlorate and bismuth nitrate resulted in similar residual chromium concentrations. Either one is acceptable as a bismuth source, although bismuth nitrate is somewhat less expensive.

EXAMPLE 2

Separation of Hexavalent Chromium from Precipitating Reagent and Hexavalent Chromium Recovery Readily-available acids were considered for the extraction of chromium from bismuth chromate. In all instances, the known physical characteristics of the bismuth compound that would be formed were first examined. Thus, for example, in considering the use of concentrated sulfuric acid, the solubility characteristics of bismuth sulfate were first examined. Using this approach, it was found that sulfuric, phosphoric, hydrochloric, and hydrofluoric acids would theoretically form insoluble bismuth compounds, while simultaneously extracting hexavalent chromium. Given the difficulties in handling concentrated hydrofluoric acid under most circumstances, the use of this reagent may not be desirable, although it should work. No further testing was done with hydrofluoric acid.

Figure 7:
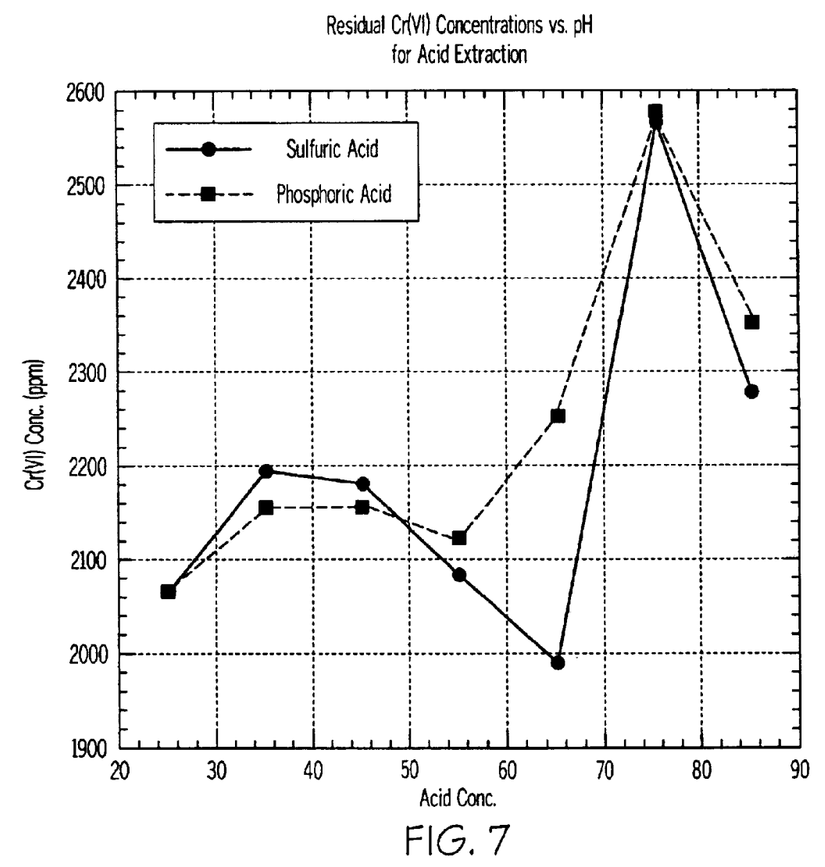
FIG. 7 is a graph showing the residual Cr(VI) concentration v. acid concentration for extraction of bismuth chromate.

This phase of testing involved subjecting carefully dried and weighed bismuth chromate precipitates to controlled volumes of concentrated acids of known speciation and concentration. Specifically, 0.500 g of dried bismuth chromate precipitate was subjected to 10 ml of the concentrated acid for 2 hours, and the resulting solid was filtered twice through 0.3 micron glass fiber filter paper. The filtrate was then measured using a Perkin-Elmer AA spectrometer for both chromium and bismuth concentrations. Candidate concentrated acids were vendor-supplied reagent chemicals of known purity. Duplicate samples and analyses were performed at least every ten samples. Table 2 shows the concentrated acids and concentrations that were tested for hexavalent chromium extraction from the bismuth chromate precipitates, with resultant chromium and bismuth concentrations, along with observations and comments about each of the candidate treatment/recovery options that were tested. FIG. 7 shows a graphical representation of the extracted chromium concentrations versus acid concentration for the bismuth chromate system, while FIG. 8 shows extracted bismuth concentrations versus acid concentration for bismuth chromate precipitates.

Figure 8:
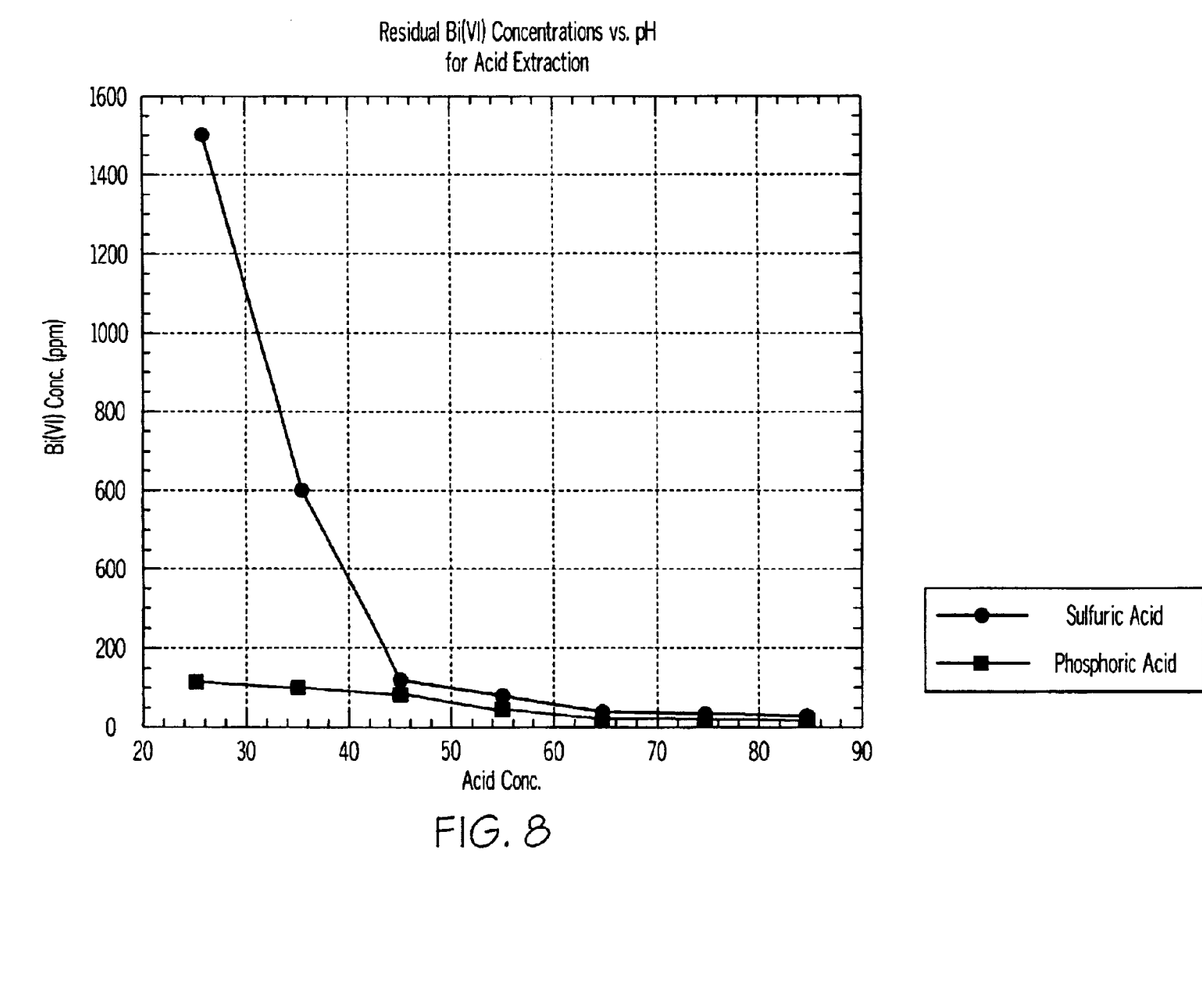
FIG. 8 is a graph showing the residual Bi concentration v. acid concentration for extraction of bismuth chromate.

Extractions with hydrochloric acid are not shown in Table 2 or FIG. 7 or 8. At every concentration tested for hydrochloric acid, no solid phase formed; rather, the solution turned dark emerald green. Simple application of concentrated HCl to bismuth chromate does not separate Cr and Bi.

TABLE 2

Extracted Chromium and Bismuth Concentrations versus Extractant Acid for Bismuth Chromate

| Tested Acid/Conc. | Extracted Cr Concentrations ppm (mg/L) | Extracted Bi Concentrations ppm (mg/L) | Comments |
| --- | --- | --- | --- |
| $H_2SO_4$-85% | 2274 | 5 | Yellow filtrate |
| $H_2SO_4$-75% | 2563 | 10 | Yellow filtrate |

TABLE 2-continued

Extracted Chromium and Bismuth Concentrations versus
Extractant Acid for Bismuth Chromate

| Tested Acid/Conc. | Extracted Cr Concentrations ppm (mg/L) | Extracted Bi Concentrations ppm (mg/L) | Comments |
|---|---|---|---|
| $H_2SO_4$-65% | 1985 | 10 | Yellow filtrate |
| $H_2SO_4$-55% | 2077 | 75 | Yellow filtrate |
| $H_2SO_4$-55%* | 2105 | 80 | Yellow filtrate |
| $H_2SO_4$-45% | 2180 | 100 | Yellow filtrate |
| $H_2SO_4$-35% | 2196 | 600 | Yellow filtrate |
| $H_2SO_4$-25% | 2063 | 1500 | |
| $H_3PO_4$-85% | 2350 | 5 | Yellow filtrate |
| $H_3PO_4$-75% | 2579 | 5 | Yellow filtrate |
| $H_3PO_4$-65% | 2248 | 5 | Yellow filtrate |
| $H_3PO_4$-55% | 2122 | 55 | Yellow filtrate |
| $H_3PO_4$-55%* | 2143 | 50 | Yellow filtrate |
| $H_3PO_4$-45% | 2158 | 91 | Yellow filtrate |
| $H_3PO_4$-35% | 2155 | 95 | |
| $H_3PO_4$-25% | 2056 | 100 | |

*Duplicate sample

Both phosphoric acid and sulfuric acid achieve satisfactory separation of Bi and Cr from the precursor bismuth chromate. Although phosphoric acid results in slightly lower Bi in the filtrate (hence, greater separation), it introduces a "foreign" anion (phosphate) to the hexavalent chromium. Chrome plating solutions are composed primarily of hexavalent chromium and sulfuric acid, so the use of concentrated sulfuric acid to achieve the separation does not involve the use of a "foreign" anion.

As can be seen from the data, a concentration of between 65 and 85 weight percent sulfuric acid achieves optimum separation of hexavalent chromium from the formed bismuth sulfate. Carryover of bismuth to the hexavalent chrome filtrate is approximately 10 ppm at these acid concentrations.

EXAMPLE 3
Optional Recovery of Precipitating Reagent

In order to make the overall recovery process economically viable, it is desirable to recycle the precipitating reagent, such as bismuth, minimizing losses at each processing step. Therefore, re-conversion of the formed bismuth sulfate to soluble bismuth (bismuth nitrate or perchlorate) is desirable.

Both nitric and perchloric acids, of varying concentrations (25 to 70 weight percent), were applied to the bismuth sulfate precipitates derived from the previous treatment step. None of the samples was completely dissolved in the acid solutions, suggesting that complete conversion to the nitrate or perchlorate could not be achieved directly with concentrated acid.

There are three forms of bismuth nitrate, two of which are insoluble in water. One way to obtain soluble bismuth nitrate is to roast the bismuth sulfate first at a low temperature (200° C.) to convert it to the oxide, and then subject the oxide to concentrated nitric acid. The molar ratio of acid to bismuth oxide should be greater than or equal to 4:1 in order to avoid producing insoluble bismuth nitrate. Using this method, the bismuth was completely dissolved. Fine crystals of soluble bismuth nitrate were then formed through evaporation of a majority of the liquor, followed by filtration.

In a similar fashion, to form bismuth perchlorate, the sulfate may first be converted to the oxide through low temperature (200° C.) roasting. Application of 70% perchloric acid to this compound, at a 2:1 or higher molar ratio of acid to Bi, followed by evaporation and filtration produced soluble bismuth perchlorate.

If the low temperature roast to convert the precipitate into an oxide is performed, it should generally be at a temperature of less than about 250° C.

EXAMPLE 4
Bench-scale Testing with Chromium Plating Wastes

The performance of the process was tested on an actual chrome plating line. Bench-scale testing with the recovered chromium was performed on a small chrome plating tank. Chromium was recovered from chrome plating wastes (pH=1.5) obtained from a commercial plater using bismuth perchlorate. Separation from the formed bismuth chromate was achieved using a 75 weight % sulfuric acid solution. This extract was then used as the starting bath for chrome plating.

Figure 9:
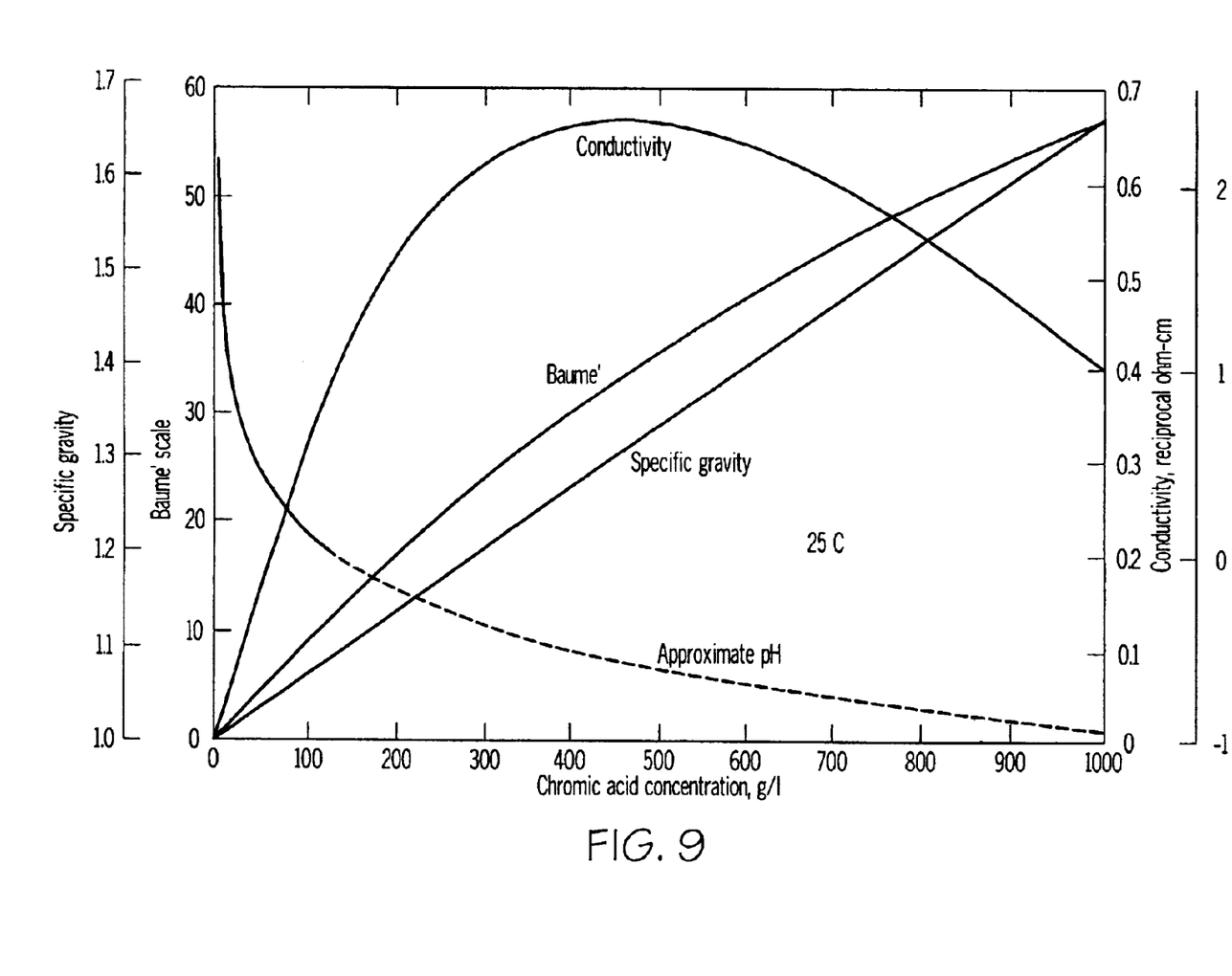
FIG. 9 is a graph showing the specific gravity/conductivity relationships for commercial chrome plating solutions.

As can be seen from FIG. 9, the performance of commercial chrome plating baths is evaluated using specific gravity and conductivity. The specific gravity of these plating baths is primarily a measure of sulfuric acid concentration, whereas conductivity is primarily a measure of chromium concentration. Therefore, when the conductivity of commercial chrome plating solutions begins to fall, operators know that the chromium concentrations are falling.

In measuring the specific gravity of the recovered chromium extracts, we found that the sulfuric acid content was too high. It was therefore necessary to dilute with deionized water to achieve the proper specific gravity. In doing so, the chromium concentrations were too low, and it was necessary to add "virgin" chromium to bring the conductivity up to acceptable levels. Chrome plating was then possible using this revised solution.

Although the process was discussed primarily in terms of plating waste streams, it is not limited to plating wastes. It can be used on any hexavalent chromium containing stream, including but not limited to, waste streams from metal fabrication operations including chrome plating, anodizing, conversion coating, and phosphating, waste streams from paints and paint extracts, oxidizing solutions from the manufacture of polymers and plastics, wastes from leather tanning, wastes from wood preservatives, fungicides, and other pesticides, and leachates from landfills and contaminated sites. The wastes can be subsurface releases, or drummed, tanked, or otherwise containerized chrome wastes in either the solid or liquid state.

The process is typically performed with aqueous streams. If a solid waste containing hexavalent chromium is to be tested, it can first be converted to an aqueous stream. For example, solid paints or paint wastes containing hexavalent chromium can easily be converted into the aqueous state through the application of a strong acid, such as sulfuric or nitric. The majority of the hexavalent chromium will then be portioned into the aqueous state.

This process is easy to implement under a wide range of conditions. The reactions used in the process involve solubilization adjustment through the addition of chemical reagents as well as pH and temperature control and subsequent filtration or centrifigation. These processes are much easier to control than other processes such as biological, membrane, or ion exchange. The closed loop recycling of hexavalent chromium as well as precipitating reagent ensures that emissions and material losses are minimized, reducing the quantities of virgin input materials that are necessary.

Although it does not meet the 5 ppm discharge limit for hexavalent chromium, the process does allow for the easy recovery and reuse of much of the hexavalent chromium in the waste water, which is not practical with current techniques.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A process for recovery of hexavalent chromium from a stream comprising:

providing the stream containing hexavalent chromium;

reacting a soluble precipitating reagent with the hexavalent chromium to form an insoluble precipitating reagent-chromate precipitate, wherein the soluble precipitating reagent is selected from bismuth compounds; lanthanide compounds; aluminum compounds; titanium compounds, trivalent chromium compounds; organic compounds containing a group selected from nitronium, phosphonium, sulfonium, stibonium, iodonium, pyrylium, or combinations thereof; or combinations thereof;

reacting the insoluble precipitating reagent-chromate precipitate with an acidic solution to form an insoluble precipitating reagent precipitate and a soluble hexavalent chromium compound; and recovering the soluble hexavalent chromium compound.

2. The process of claim 1 wherein the acidic solution is selected from sulfuric acid, hydrochloric acid, hydrofluoric acid, boric acid, phosphoric acid, pyrophosphoric acid, phosphomolybdic acid, phosphotungstic acid, silicomolybdic acid, silicotungstic acid, or combinations thereof.

3. The process of claim 1 wherein the acidic solution is selected from acidic oxalates, malonates, succinates, maleates, fumarates, malates, tartrates, salicylates, or combinations thereof.

4. The process of claim 1 wherein the insoluble precipitating reagent-chromate precipitate has a solubility of less than $1 \times 10^{-2}$ M $Cr^{+6}$.

5. The process of claim 4 wherein the insoluble precipitating reagent-chromate precipitate has a solubility of less than $5 \times 10^{-3}$ M $Cr^{+6}$.

6. The process of claim 1 wherein the process is carried out at temperatures in the range of from about 5° C. to about 100° C.

7. The process of claim 1 wherein recovering the soluble hexavalent chromium compound comprises obtaining a solid using a process selected from evaporation, freeze drying, or salting out.

8. The process of claim 1 further comprising reacting the insoluble precipitating reagent precipitate with a solubilizing reagent to form the soluble precipitating reagent.

9. The process of claim 8 wherein the solubilizing reagent is selected from nitric acid, perchloric acid, sulfuric acid, hydrochloric acid, acetic acid, propionic acid, lactic acid, citric acid, or combinations thereof.

10. The process of claim 8 further comprising recovering the soluble precipitating reagent using a process selected from evaporation, freeze-drying, or salting out.

11. The process of claim 1 wherein the precipitating reagent is an organic compound containing a group selected from nitronium or phosphonium.

12. The method of claim 8 further comprising heating the insoluble precipitating reagent precipitate to a temperature of less than about 250° C. to convert the insoluble precipitating reagent precipitate to an oxide or hydroxide before reacting the insoluble precipitating reagent precipitate with the solubilizing reagent.

13. The method of claim 1 wherein the stream containing hexavalent chromium is selected from chrome plating process waste streams, anodizing process waste streams, conversion coating process waste streams, phosphating process waste streams, paint process waste streams, paint extract process waste streams, polymerization process waste streams, leather tanning process waste streams, wood preservative waste streams, fungicide waste streams, pesticide waste streams, landfill waste streams, contaminated site waste streams, or combinations thereof.

14. The method of claim 1 wherein the stream containing hexavalent chromium is an aqueous stream.

15. A process for recovery of hexavalent chromium from a stream comprising:

providing the stream containing hexavalent chromium;

reacting a soluble precipitating reagent with the hexavalent chromium to form an insoluble precipitating reagent-chromate precipitate, wherein the soluble precipitating reagent is selected from bismuth compounds; lanthanide compounds; titanium compounds; trivalent chromium compounds; organic compounds containing a group selected from nitronium, phosphonium, sulfonium, stibonium, iodonium, pyrylium, or combinations thereof; or combinations thereof; and recovering the insoluble precipitating reagent-chromate precipitate.

16. The process of claim 15 wherein the insoluble precipitating reagent-chromate precipitate has a solubility of less than $1 \times 10^{-2}$ M $Cr^{+6}$.

17. The process of claim 16 wherein the insoluble precipitating reagent-chromate precipitate has a solubility of less than $5 \times 10^{-3}$ M $Cr^{+6}$.

18. The process of claim 15 wherein the process is carried out at temperatures in the range of from about 5° C. to about 100° C.

19. The process of claim 18 further comprising:

reacting the insoluble precipitating reagent-chromate precipitate with an acidic solution to form an insoluble precipitating reagent precipitate and a soluble hexavalent chromium compound; and recovering the soluble hexavalent chromium compound.

20. The process of claim 19 wherein the acidic solution is selected from sulfuric acid. hydrochloric acid, hydrofluoric acid, boric acid, phosphoric acid, pyrophosphoric acid. phosphomolybdic acid, phosphotungstic acid, silicomolybdic acid, silicotungstic acid, or combinations thereof.

21. The process of claim 19 wherein the acidic solution is selected from acidic oxalates, malonates, succinates, maleates, fumarates, malates, tartrates, salicylates, or combinations thereof.

22. The process of claim 19 wherein recovering the soluble hexavalent chromium compound comprises obtaining a solid using a process selected from evaporation, freeze drying, or salting out.

23. The process of claim 19 further comprising reacting the insoluble precipitating reagent precipitate with a solubilizing reagent to form the soluble precipitating reagent.

24. The process of claim 23 wherein the solubilizing reagent is selected from nitric acid, perchloric acid, sulfuric acid, hydrochloric acid, acetic acid, propionic acid, lactic acid, citric acid, or combinations thereof.

25. The process of claim 23 further comprising recovering the soluble precipitating reagent using a process selected from evaporation, freeze-drying, or salting out.

26. The process of claim 15 wherein the precipitating reagent is an organic compound having a group selected from nitronium or phosphonium.

27. The method of claim 23 further comprising heating the insoluble precipitating reagent precipitate to a temperature of less than about 250° C. to convert the insoluble precipitating reagent precipitate to an oxide or hydroxide before reacting the insoluble precipitating reagent precipitate with the solubilizing reagent.

28. The method of claim 15 wherein the stream containing hexavalent chromium is selected from chrome plating process waste streams, anodizing process waste streams, conversion coating process waste streams, phosphating process waste streams, paint process waste streams, paint extract process waste streams, polymerization process waste streams, leather tanning process waste streams, wood preservative waste streams, fungicide waste streams, pesticide waste streams, landfill waste streams, contaminated site waste streams, or combinations thereof.

29. The method of claim 15 wherein the stream containing hexavalent chromium is an aqueous stream.

30. A process for recovery of hexavalent chromium from a stream comprising:

providing the stream containing hexavalent chromium;

reacting a soluble precipitating reagent with the hexavalent chromium to form an insoluble precipitating reagent-chromate precipitate, the soluble precipitating reagent selected from bismuth compounds; lanthanide compounds; aluminum compounds; titanium compounds; trivalent chromium compounds; organic compounds containing a group selected from nitronium, phosphonium, sulfonium, stibonium, iodonium, pyrylium, or combinations thereof; or combinations thereof;

reacting the insoluble precipitating reagent-chromate precipitate with an acidic solution to form an insoluble precipitating reagent precipitate and a soluble hexavalent chromium compound;

recovering the soluble hexavalent chromium compound; and reacting the insoluble precipitating reagent precipitate with a solubilizing reagent to form the soluble low toxicity precipitating reagent.

31. The process of claim 30 wherein the acidic solution is selected from sulfuric acid, hydrochloric acid, hydrofluoric acid, boric acid, phosphoric acid, pyrophosphoric acid, phosphomolybdic acid, phosphotungstic acid, silicomolybdic acid, silicotungstic acid, or combinations thereof.

32. The process of claim 30 wherein the acidic solution is selected from acidic oxalates, malonates, succinates, maleates, fumarates, malates, tartrates, salicylates, or combinations thereof.

33. The process of claim 30 wherein the insoluble precipitating reagent-chromate precipitate has a solubility of less than $1 \times 10^{-2}$ M $Cr^{+6}$.

34. The process of claim 33 wherein the insoluble precipitating reagent-chromate precipitate has a solubility of less than $5 \times 10^{-3}$ M $Cr^{+6}$.

35. The process of claim 30 wherein the solubilizing reagent is selected from nitric acid, perchloric acid, sulfuric acid, hydrochloric acid, acetic acid, propionic acid, lactic acid, citric acid, or combinations thereof.

36. The process of claim 30 wherein the process is carried out at temperatures in the range of from about 5° C. to about 100° C.

37. The process of claim 30 wherein recovering the soluble hexavalent chromium compound comprises obtaining a solid using a process selected from evaporation, freeze drying, or salting out.

38. The process of claim 30 further comprising recovering the soluble precipitating reagent using a process selected from evaporation, freeze-drying, or salting out.

39. The process of claim 30 wherein the precipitating reagent is an organic compound having a group selected from nitronium or phosphonium.

40. The method of claim 30 further comprising heating the insoluble precipitating reagent precipitate to a temperature of less than about 250° C. to convert the insoluble precipitating reagent precipitate to an oxide or hydroxide before reacting the insoluble precipitating reagent precipitate with the solubilizing reagent.

41. The method of claim 30 wherein the stream containing hexavalent chromium is selected from chrome plating process waste streams, anodizing process waste streams, conversion coating process waste streams, phosphating process waste streams, paint process waste streams, paint extract process waste streams, polymerization process waste streams, leather tanning process waste streams, wood preservative waste streams, fungicide waste streams, pesticide waste streams, landfill waste streams, contaminated site waste streams, or combinations thereof.

42. The method of claim 30 wherein the stream containing hexavalent chromium is an aqueous stream.

* * * * *

UNITED STATES PATENT AND TRADEMARK OFFICE
CERTIFICATE OF CORRECTION

PATENT NO. : 6,833,124 B2
DATED : December 21, 2004
INVENTOR(S) : Phelps et al.

It is certified that error appears in the above-identified patent and that said Letters Patent is hereby corrected as shown below:

Column 14,
Line 41, "sulfuric acid." should read -- sulfuric acid, --
Line 42, "pyrophosphoric acid." should read -- pyrophosphoric acid, --

Signed and Sealed this

Thirty-first Day of May, 2005

JON W. DUDAS
*Director of the United States Patent and Trademark Office*